(12) United States Patent
Vierthaler et al.

(10) Patent No.: US 8,095,743 B2
(45) Date of Patent: *Jan. 10, 2012

(54) MEMORY ACCESS CONTROL IN A MULTIPROCESSOR SYSTEM

(75) Inventors: Matthias Vierthaler, Denzlingen (DE); Carsten Noeske, Sexau (DE)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 12/749,011

(22) Filed: Mar. 29, 2010

(65) Prior Publication Data

US 2010/0235589 A1 Sep. 16, 2010

Related U.S. Application Data

(63) Continuation of application No. 11/503,673, filed on Aug. 14, 2006, now Pat. No. 7,689,779.

(30) Foreign Application Priority Data

Aug. 12, 2005 (DE) .................... 10 2005 038 567

(51) Int. Cl.
*G06F 12/00* (2006.01)

(52) U.S. Cl. ........ 711/147; 711/151; 711/152; 711/157; 710/240; 712/220; 712/225

(58) Field of Classification Search .................. 711/147, 711/151, 152, 157–158, 169, E12.038; 710/240; 712/220, 225

See application file for complete search history.

(56) References Cited

U.S. PATENT DOCUMENTS

| 4,484,273 A | 11/1984 | Stiffler et al. |
| 6,314,505 B1 | 11/2001 | Nakashima et al. |
| 6,931,506 B2 * | 8/2005 | Audrain ........................ 711/169 |
| 2005/0050282 A1 | 3/2005 | Vantalon et al. |
| 2005/0080999 A1 | 4/2005 | Angsmark et al. |

FOREIGN PATENT DOCUMENTS

| EP | 0249720 | 12/1987 |
| EP | 0372578 | 6/1990 |
| EP | 1132818 | 9/2001 |

OTHER PUBLICATIONS

Franke et al., "Gang Scheduling for Highly Efficient, Distributed Multiprocessor Systems", Proceedings of the Sixth Symposium of the Frontier of Massively Parallel Computing, 1996, p. 4-12.
Chow-Sing Lin et al., "Efficient Algorithms for Slot-Scheduling and Cycle-Scheduling of Video Streams on Clustered Video Servers", Multimedia Tools and Applications, 13, pp. 213-227, Kluwer Academic Publishers, 2001.

* cited by examiner

*Primary Examiner* — Jasmine Song
(74) *Attorney, Agent, or Firm* — O'Shea Getz P.C.

(57) ABSTRACT

Access to a memory area by a first processor that executes a first processor program and a second processor that executes a second processor program is granted to one of the first processor and the second processor at a time. Access to the memory area by the first processor and the second processor are cyclically uniquely allocated (e.g., t=[(ad mod m)=o]) between the first and the second processor by the first and second processor programs.

8 Claims, 2 Drawing Sheets

MEMORY ACCESS CONTROL IN A MULTIPROCESSOR SYSTEM

PRIORITY INFORMATION

This application is a continuation of Ser. No. 11/503,673 filed Aug. 14, 2006 now U.S. Pat. No. 7,689,779.

BACKGROUND INFORMATION

The invention relates to controlling memory access in a multiprocessor system.

Multiprocessor architectures have at least a first processor and a second processor, and a memory area to which each of these processors have access. One of the processors at a time is allowed access to the memory. Access to the memory area can be effected by appropriately programmed or fashioned hardware architecture.

In general, the computing power of a system that is built on discrete components or implemented with an integrated circuit is continually enhanced. The processors in the system can be improved or driven at higher clock speeds for this purpose. It is also possible to increase the number of processors or processor kernels. Because it is not always possible to boost the power of the individual processor kernel, more and more often a plurality of processors or processor kernels, which are capable of processing the required computational steps in parallel with one another, are placed in one system.

A problem in such arrangements is that between the individual processors an interface is needed via which the processors can exchange data. A memory having a memory area that all processors can access is preferably used as interface for this purpose.

As known, dual-port RAM (random access memory) can be accessed simultaneously from two sides by two processors. In order to make this possible, such a memory exhibits separate address and data bus systems as well as arbitration logic, which initiates appropriate collision-prevention actions in the case of simultaneous write operations. Such a dual-port RAM is disadvantageously larger than a normal RAM, so that a larger footprint area is required. In addition, the expensive arbitration logic must prevent simultaneous writing to the same RAM cell, that is, to the same memory area at the same time by both processors. Usually one of the two processors is halted by the arbitration logic in case of a conflict.

Also known is the use of a separate arbitration logic in conjunction with a RAM that is subdivided into smaller blocks of individual memory areas. If a plurality of processors want to access the same block at the same time, only one of these processors receives write/read permission. The other processors are halted. This requires an expensive logic in the processor kernels and in the driving of the RAMs.

RISC computing systems have a reduced instruction set. In computers having a corresponding processor architecture, any individual instruction executes only relatively simple operations. In such a processor architecture, an individual processor program or an individual program sequence is allocated to each one of the processors. Each of these program sequences uses corresponding instructions to control the processing of data as well as memory accesses to a memory area individually allocated to the processor and also to memory areas used in common by a plurality of processors. In the program sequence there can also be jumps, which relocate the processing sequence of the allocated processor from one program address to another program address within the program sequence.

There is a need for improved memory access control in a multiprocessor architecture.

SUMMARY OF THE INVENTION

To control memory accesses to a memory area by a first and a second processor access to the memory area is cyclically uniquely allocated to each of the processors by executable program instructions within the first and second processors.

A processor program furnishes memory accesses at cyclically uniquely allocated program addresses. The processor program for one of the processors provides memory accesses to the memory area at cyclically uniquely allocated program addresses, which, in comparison with the program addresses for memory accesses of another processor program of another of the processors, are furnished at a value offset relative to a cycle time.

Memory accesses of an o-th one of the processors take place at times and/or at processor program addresses ad satisfying the criteria:

$$(ad \bmod m) = o$$

where m is a value equal to or greater than the number of processors that cyclically uniquely access the memory area.

The processor programs may run temporally offset relative to one another and memory accesses within the processor programs may be entered at program addresses cyclically equal relative to other processor programs of another processor.

The processor programs of the processors may run temporally simultaneously with one another and memory accesses within the processor programs may be entered at program addresses cyclically equal relative to other processor programs of another processor.

In one of the processor programs, a program jump may be entered from an instantaneous program address ad to a subsequent program address $ad_{new}$, according to the cyclical allocation for this processor. A technique is preferred wherein a program jump satisfying:

$$(ad_{new} - 1) \bmod m = ad \bmod m$$

is entered, where m is a value equal to or greater than the number of processors.

Memory accesses and/or program jumps within one of the processor programs may be allocated to one or a plurality of last address bits of a corresponding program address of the corresponding processor, with the cyclical allocation taken into account.

The processor programs for the various ones of the processors, with regard to the times or program addresses for memory accesses and/or program jumps, are furnished in mutually matched fashion by a higher-level instance or a higher-level process. This may be implemented for example by appropriate programming on the part of a programmer and/or by a suitably set-up assembling or compiling device.

A multiprocessor system includes at least a first processor and a second processor, and a memory area to which the first and second processors have access. A processor program individually allocated to the processor in question permits access to the memory area only at times cyclically uniquely allocated for this processor and, within the cycle, temporally offset relative to the other processors.

Logic links times for memory accesses to the memory area and/or jumps within the processor program in question in cyclical fashion in dependence on the last bit or bits of a program address of the processor program.

The program sequences or processor programs of the individual processors may be constructed and/or driven in such fashion that relatively expensive hardware arbitration logic is not required. This makes it possible to save footprint area and computing power.

The program sequences to control access to the memory area may be suitably constructed during programming and implemented by a compiler and/or assembler. Within the system, the program sequences offset all processors that can access a common memory area into a clearly defined state relative to one another.

A cyclically unique allocation of permissible times for access to the memory area may be implemented by the use of the modulo function in the creation of the program sequences. In such a system the last bits of the program addresses of the respective processors can advantageously exhibit a cyclically unique spacing relative to one another independently of the program sequence, in simple cases for example a constant difference. Alternatively, it is also possible to have a separate counter running at the same time, the counter values ultimately being in a fixed relation to the last bits of the program addresses. The last bits of the address can then be evaluated and then correspondingly, in dependence thereon, the memory area or memory can be associated with a uniquely allocated one of the processors, so that access to the memory or a part of the memory is always permitted to only one of the processors. The executable program instructions in the form of the program sequences ensures that a processor accesses the memory or memory area only when, according to the corresponding address bit of its program sequence, it also has access authorization from the logic circuit.

The number of program address bits that are used for memory access control depends on the number of processors that can use the memory area in common. In the case of two processors, only the last bit of the program addresses of these two processors need to be considered. In the case of four processors, the last two bits are used. If the number of processors is greater, the number of bits of the corresponding program addresses used is increased correspondingly.

In the case of jumps within one of the program sequences from an instantaneous program address not to a program address that follows directly but instead to a program address lying behind or further ahead, in order to ensure the control of suitable memory access times for one of these processors, all processors of the system are advantageously permitted to execute jumps only with consideration of the cyclical spacing of the permitted memory access times. In the case of a system having just two processors, a jump from an even program address is correspondingly allowed only to an odd program address, and from an odd program address only to an even program address. The implementation can be effected for example by hardware or directly by the software or the compiler.

It is advantageously ensured that all processors at a certain time within their individual program sequences each process a certain program address or a program address cyclically uniquely allocated to this certain program address. For example, after a reset, all processors can simultaneously start at address 0 or offset by a defined number of clock cycles relative thereto. This ensures that all processors are always left with instructions for a memory access in the processing of program steps in cyclical fashion relative to one another.

A logic circuit may correspondingly perform a configuration of one or a plurality of memory areas or RAM blocks in such fashion that a certain one of the processors always accesses the memory area in an even clock cycle, while the other processor always accesses the memory area in an odd clock cycle. Write or read rights thus alternate with each processor cycle. Thus it is possible to ensure in simple fashion, through the software or the compiler that controls the allocated one of the processors as program sequence in each case, that the two processors always access the memory area only when they are in the correct clock cycle.

It is especially advantageous if an instruction or an instruction word always has the same length for all processors, as is generally the case in so-called RISC processors.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
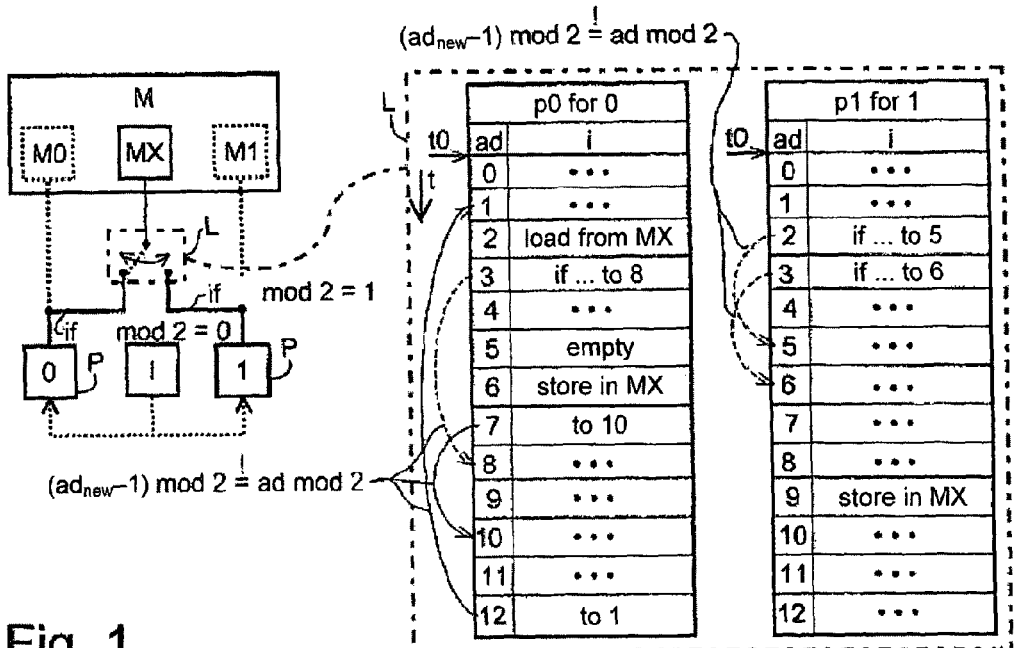
FIG. 1 schematically illustrates a multiprocessor architecture having two processors that use a common memory area, as well as program sequences that are allocated to the processors.

FIG. 1 illustrates a multiprocessor architecture that includes a first processor 0 and a second processor 1 and at least one memory device M, which the first and second processors can access in order to write and/or read data. Although the embodiment illustrated in FIG. 1 illustrates two processors for ease of illustrating, one of ordinary skill will recognize that the present invention is certainly not limited to two processors. Allocated to each of the processors 0, 1 is an individual processor program p0, p1, respectively which is programmed into its respective one of the processors 0, 1 via a programming interface I or is entered directly when the processor is manufactured. Each of the processors 0, 1 thus has its own processor program p0 or p1 respectively for controlling it. Separate individual processor memory area M0 or M1 respectively in the memory device M may be allocated to each of the processors 0, 1.

The memory device M includes a memory area MX to which both the processors 0, 1 have access. The memory area MX may also be a freestanding memory device. Access of the processors 0, 1 to the memory area MX is controlled such that only at most one of the processors 0, 1 is always granted access, in particular write access, to this memory area at a time t. Control of memory access times is effected by logic L, which is illustrated as structural components in the form of a switch solely for pictorial illustration. The logic L may be implemented by software control using processor programs p0, p1, without a switching apparatus fashioned in hardware. However, it is contemplated that hardware switching may also be used or even a combined hardware/software switching solution.

Control of memory accesses to the memory area MX by the logic L is implemented such that the processors 0, 1 and/or their program sequences gets access to the memory area MX only at times t at which access is cyclically uniquely allocated for the processor in question.

For coordination of the processors 0, 1, their processor programs p0, p1 are synchronized by a synchronization signal t0 so the program sequences both begin with the same address, for example program address 0. At each clock pulse, the program sequences advance by one program step, unless program jumps are provided within one of the program sequences. For the control of the cyclically unique access of the processors 0, 1 to the memory area MX, the first processor 0 may access the memory area MX only at even program addresses 0, 2, 4, 6, 8, . . . This is mathematically describable by the modulo function mod 2=0. Similarly, the second processor 1 may access the memory area MX only at odd program addresses 1, 3, 5, 7, 9, . . . , which can be described by the modulo function mod 2 equals 1. Such a stipulation in relation to the processor programs p0, p1 or their program sequences furnishes a simple logic or logic circuit that prevents a collision of accesses to the memory area MX by the two processors 0, 1.

For example, as illustrated in FIG. 1, the first processor 0 accesses the memory area MX to store data at a sixth program address ad equals 6, while the second processor 1 accesses the memory area MX for storage at the program step of its ninth program address ad equals 9. The first processor 0 accesses the memory area MX to load data from the memory area MX at, for example, its second program step, that is, at the instruction according to the second program address ad equals 2.

In the programming, or as appropriate in the assembly or compilation, of both the processor programs p0 and p1, it is correspondingly made certain that both the processors 0, 1 or respectively their allocated processor programs p0, p1 access the memory area MX only at cyclically uniquely allocated times t or at cyclically uniquely allocated program addresses ad.

In order to make this certain in the case of program sequences having program jumps within the processor program p0, p1, it is stipulated for such program jumps that they are to be executed with uniquely allocated times or program addresses ad taken into account. In the case of the arrangement having two processors 0, 1, this can be described by:

$$(ad_{new}-1) \bmod 2 = ad \bmod 2$$

where $ad_{new}$ is the program address to which the jump is to be made and ad is the instantaneous program address.

For example, referring still to FIG. 1, in the processor program p0 of the first processor 0 there is an optional jump from the third program step or the third program address ad to the eighth program address. Instead of proceeding from the third program address (i.e., ad=3) to fourth program address (i.e., ad=4), that is, to an immediately following even program address ad, the program sequence proceeds to another even program address ad, namely the eighth program address (i.e., ad=8). An additional program jump is illustrated from the seventh program address (i.e., ad=7) to the tenth program address (i.e., ad=10). If a program jump is executed starting from an even program address ad, the jump must take place to an odd program address, as for example from twelfth program address (i.e., ad=12) to first program address (i.e., ad=1). Similarly, jumps between program addresses ad are also sketched in the processor program p1 of the second processor 1, jumps again taking place from even program addresses ad to odd program addresses ad and from odd program addresses ad to even program addresses ad.

In this way, starting at the synchronization time, both the processors 0, 1 are always either at an even or at an odd program address ad, and indeed even if there are program jumps in the program sequence. For memory accesses, accordingly, if the program sequences are programmed with the conditions for cyclical access rights to the memory area MX and with the additional conditions for program jumps, if any, collision-free memory access to the memory area MX can be ensured without relatively expensive arbitration logic and in particular without totally halting the processors. To this end, empty steps are simply incorporated into the program sequence as appropriate, as for example in the case of the fifth program address (i.e., ad=5) of the first processor 0, if a memory access would otherwise fall at an impermissible access time.

Figure 2:
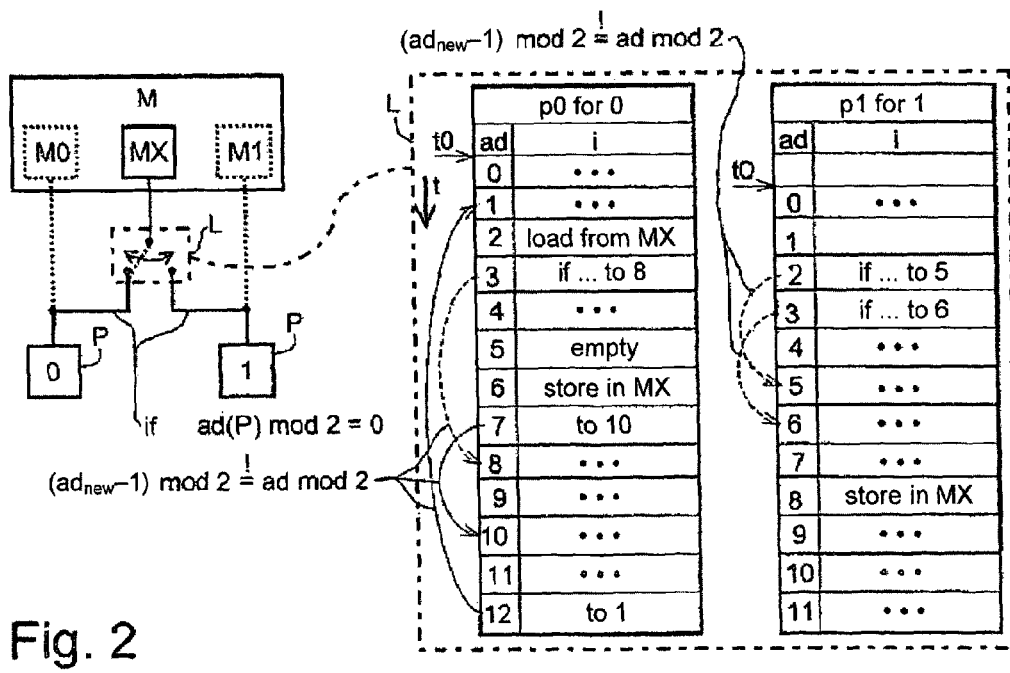
FIG. 2 schematically illustrates a multiprocessor architecture having two alternative program sequences.

FIG. 2 illustrates an alternative or, as appropriate, also a combined embodiment wherein both the processors 0, 1 are started and/or synchronized at offset times using a synchronization signal t0. For example, the two program sequences are offset in such fashion that an odd program address ad of the processor program p1 of the second processor 1 falls simultaneously with an even program address ad of the process program p0 of the first processor 0. In this embodiment the program sequences are so fashioned that both the processors 0, 1 may each access the memory area MX when the program sequence of the processor programs p0, p1 is at an even program address ad. For example, memory accesses take place at the second and sixth program address (i.e., ad=2 and ad=6) respectively, of the process program p0 of the first processor 0 and, respectively, at the eighth program address ad=8 of the processor program p1 of the second processor 1. In this embodiment the programmer, assembler or compiler makes certain that an access to the memory area MX always takes place on an even—or alternatively always on an odd—program address ad, because at a time t both the processor programs p0, p1 are always at an even program address ad on the one hand and at an odd program address ad on the other. This lightens the work of programming and avoids programming errors. With regard to program jumps, the same conditions apply as in the embodiment illustrated in FIG. 1.

Figure 3:
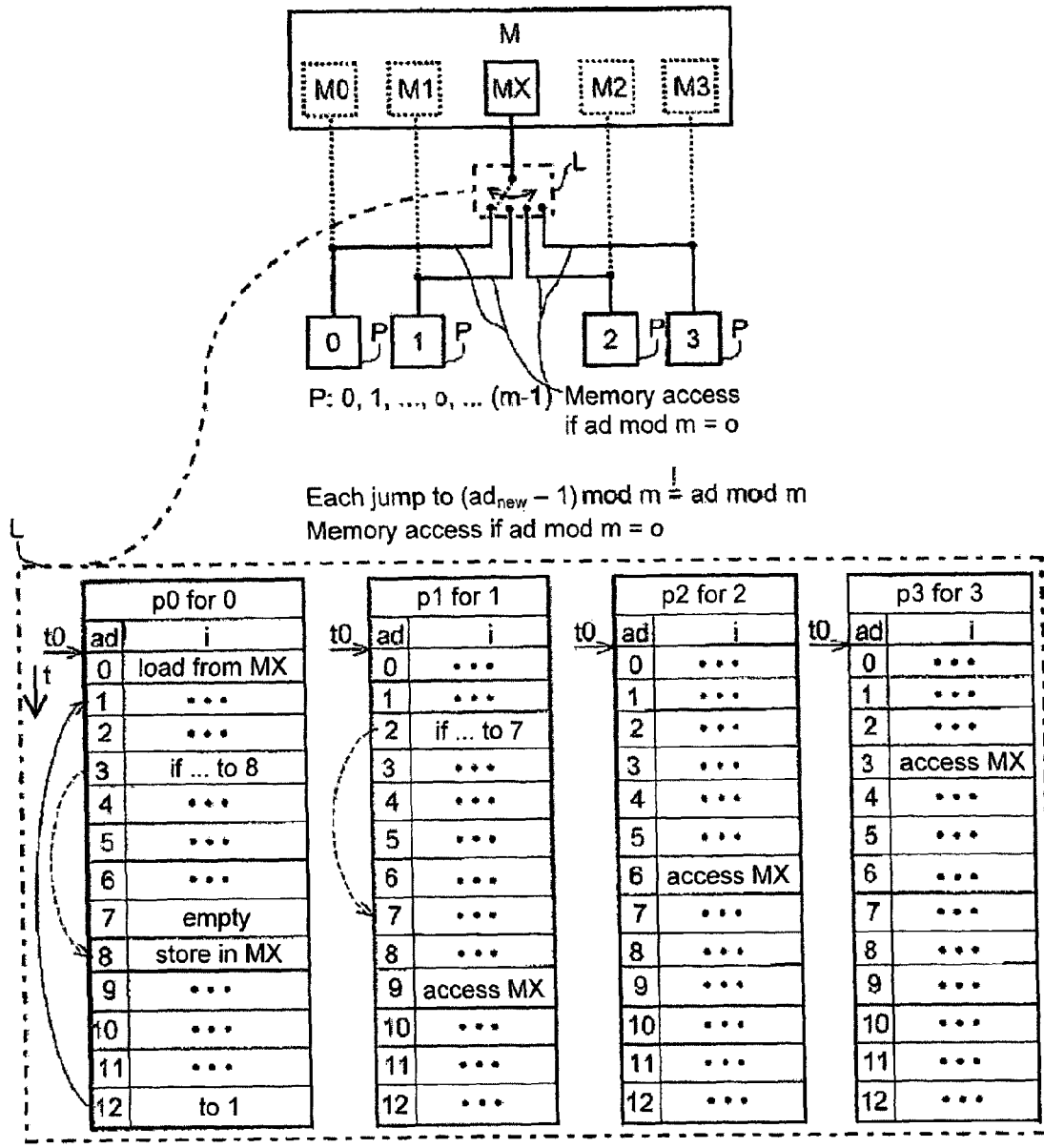
FIG. 3 schematically illustrates a multiprocessor architecture having four processors that can access the same memory area, and having four program sequences correspondingly allocated to the processors.

FIG. 3 illustrates an embodiment of a multiprocessor architecture that includes four processors 0, 1, 2, 3. As in the embodiment illustrated in FIG. 1, an individually allocated memory segment M0-M3 or memory may be allocated to each of the processors 0-3. Here it is important that the four processors 0-3 all have access to a memory area MX, which as appropriate is also embodied in a freestanding memory device. Once again accesses to memory area M are controlled by logic L, preferably implemented in software by suitable programming of individual processor programs p0-p3 of the processors 0-3. With respect to memory accesses, a cycle of permissible program addresses ad is stipulated, which cycle takes into account that a number m of the four processors 0-3 may access the memory area MX. For an o-th one of the m processors 0-3 the permissible program addresses ad for memory accesses are preferably stipulated by the modulo function according to:

$$ad \bmod m = o$$

in the context of programming of the processor programs p0-p3. Naturally, other cyclical access times are also possible, for example two memory access times or addresses within each cycle for a certain one of the processors P if this processor is assigned tasks that necessitate more frequent accesses to the memory area MX than are necessary for the other processors P. In the program sequences illustrated, memory accesses to the memory area MX for loading or storing data are provided, for example, at program addresses ad equals 0 and ad equals 8 in processor program p0 of the first processor 0. In the processor programs p1, p2, p3 for the processors 1-3, correspondingly, memory accesses to the memory area MX are provided for example at program addresses ad equals 9, ad equals 6 and ad equals 3, respectively.

The calculation of permissible jumps within the processor programs p0-p3 is also modified in correspondence with the increased number of processors P may be calculated as follows:

$$(ad_{new}-1) \bmod m = ad \bmod m$$

where $ad_{new}$ is the program address to which the jump is to be executed, ad is the instantaneous program address and m is the number of processors P used.

In the example with four processors 0-3, which are all synchronized at the same time t=0 using synchronization signal t0, jumps from one of the program addresses ad to another program address $ad_{new}$, are correspondingly executed, only from an address value x*4 to another address value [(x*4)+1].

Jumps after processing of the corresponding instructions may stand correspondingly, for example, at addresses 0, 3, 7, 11 and 15 and point to jump destinations 1, 5, 9 and 13. The first processor 0 may access the memory area MX or RAM at program addresses ad=0, 4, 8, 12, . . . . The second processor 1 may access the memory area MX or RAM at program addresses ad=1, 5, 9, 13, . . . . Jumps after processing of the corresponding instructions may correspondingly stand, for example, at addresses 2, 6, 10, 14 and point to jump destinations 3, 7, 11 and 15. The third processor 2 may access the memory area MX or RAM at program addresses ad=2, 6, 10, 14, . . . . Jumps after processing of the corresponding instructions may correspondingly stand, for example, at addresses 0, 4, 8, 12 and 16 and point to jump destinations 1, 5, 9 and 13. The fourth processor 3 may access the memory area MX or RAM at program addresses ad=3, 7, 11, 15, . . . .

In general, for the special case according to FIG. 3, where for example m is the cycle time and also the number of processors; q is the next-greater power of two of m in the case of jumps directed only upward; i is a whole number with i=0, q−1; r is a whole number greater than zero; and ad is the program address, it is the case that jumps may stand only at a program address satisfying n=[(r*q)+1] and may lead only to an address n+1. In this case, the processors 0-3 are always in a cyclically defined state relative to one another. In such a case, logic L can grant access by one of the processors to a memory address or a memory when [(ad mod q)=i].

The quantity m, which governs the cycle time or cycle length, need not necessarily be tied to the number of processors P actually present but may also exhibit a larger value. This is advantageous for example when other processors or devices are to be permitted access to the memory area MX in the intervening time. The cycle time m is also expediently set correspondingly larger than the actual number of processors P when a larger permissible number of cyclical memory accesses is allocated to one of the processors P than to the others of processors P. This correspondingly impacts access times t or program addresses ad for memory accesses as well as the conditions for permissible jumps within respective processor programs p0-p3.

Although the present invention has been illustrated and described with respect to several preferred embodiments thereof, various changes, omissions and additions to the form and detail thereof, may be made therein, without departing from the spirit and scope of the invention.

What is claimed is:

1. A method for controlling access to a memory area by a first processor that executes a first processor program and a second processor that executes a second processor program, comprising:

granting access to the memory area to one of the first processor and the second processor at a time, where access to the memory area by the first processor and the second processor are cyclically uniquely allocated between the first and the second processor by the first and second processor programs, where the step of granting comprises providing memory accesses to the memory area at the cyclically uniquely allocated program addresses (ad) for the first processor, which, in comparison with program addresses for memory accesses of the second processor are furnished at a value (o) offset relative to a cycle time (m), and where memory accesses of an o-th one of the processors occur at times and/or at processor program addresses ad satisfying the equality [(ad mod m)=o] where m is a value equal to or greater than the number of processors that cyclically uniquely access memory area.

2. The method of claim 1, where in the first processor program a program jump is entered from an instantaneous program address (ad) to a subsequent program address ($ad_{new}$) according to the cyclical allocation for the first processor.

3. The method of claim 2, where a program jump satisfying [($ad_{new}$−1) mod m]=[ad mod m] is entered, where m is a value equal to or greater than the number of processors.

4. The method of claim 1, where memory accesses and/or program jumps within one of the processor programs are allocated to one or a plurality of last address bits of a corresponding program address (ad) of the corresponding processor (P), with the cyclical allocation taken into account.

5. The method of claim 1, where the processor programs for the various ones of the processors, with regard to the times or program addresses (ad) for memory accesses and/or program jumps, are furnished in mutually matched fashion by a higher-level instance or a higher-level process.

6. A method for controlling access to a memory area by a first processor that executes a first processor program and a second processor that executes a second processor program, comprising:

granting access to the memory area to one of the first processor and the second processor at a time, where access to the memory area by the first processor and the second processor are cyclically uniquely allocated between the first and the second processor by the first and second processor programs, where the step of granting comprises providing memory accesses to the memory area at the cyclically uniquely allocated program addresses (ad) for the first processor, which, in comparison with program addresses for memory accesses of the second processor are furnished at a value (o) offset relative to a cycle time (m), where the first and second processor programs execute temporally simultaneously with one another and memory accesses within the first processor program are entered at program addresses (ad) cyclically equal relative to the second processor program.

7. A multiprocessor system, comprising:

a plurality of processors comprising at least a first processor and a second processor;

a memory area to which each of the first and the second processors have access; and where each of the plurality of processors includes a uniquely associated program sequence of executable program instructions that cooperate to provide access to the memory area to one of the first processor and the second processor at a time, where access to the memory area is cyclically uniquely allocated between the plurality of processors, by providing memory accesses to the memory area at the cyclically uniquely allocated program addresses (ad) for the first processor, which, in comparison with program addresses for memory accesses of the second processor are furnished at a value (o) offset relative to a cycle time (m), and where memory accesses of an o-th one of the processors occur at times and/or at processor program addresses ad satisfying the equality [(ad mod m)=o] where m is a value equal to or greater than the number of processors that cyclically uniquely access the memory area.

8. The multiprocessor system of claim 7, where the uniquely associated program sequence of executable program instructions includes instructions that test the last bit of the program address to determine which of the first and second processors can access the memory area.

* * * * *